US010787324B2

(12) United States Patent
Neubauer (10) Patent No.: US 10,787,324 B2
(45) Date of Patent: Sep. 29, 2020

(54) CONTAINER-HANDLING INSTALLATION AND METHOD FOR CONVEYING FUNCTIONAL ELEMENTS IN A CONTAINER-HANDLING INSTALLATION FOR THE PURPOSE OF HANDLING CONTAINERS

(71) Applicant: Krones AG, Neutraubling (DE)

(72) Inventor: Michael Neubauer, Neutraubling (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 16/480,062

(22) PCT Filed: Oct. 2, 2017

(86) PCT No.: PCT/EP2017/075017
§ 371 (c)(1),
(2) Date: Jul. 23, 2019

(87) PCT Pub. No.: WO2018/137797
PCT Pub. Date: Aug. 2, 2018

(65) Prior Publication Data
US 2019/0367295 A1 Dec. 5, 2019

(30) Foreign Application Priority Data

Jan. 24, 2017 (DE) ................. 10 2017 101 331

(51) Int. Cl.
*B65G 47/92* (2006.01)
*B65G 29/00* (2006.01)
(Continued)

(52) U.S. Cl.
CPC ............. *B65G 47/92* (2013.01); *B65G 29/00* (2013.01); *B65G 54/02* (2013.01); *B65G 47/84* (2013.01)

(58) Field of Classification Search
CPC ........ B65G 54/02; B65G 47/84; B65G 47/92; B65G 29/00; B65G 47/848; B65G 47/846; B67C 3/02
(Continued)

(56) References Cited

U.S. PATENT DOCUMENTS 1,926,914 A * 9/1933 Popov ...................... B65B 39/14
198/704
4,164,997 A * 8/1979 Mueller ................ B65G 47/71
198/427
(Continued)

FOREIGN PATENT DOCUMENTS

DE 60031329 T2 4/2007
DE 102011007280 A1 10/2012
(Continued)

OTHER PUBLICATIONS

International Search Report from ISA/EP dated Jan. 15, 2018 for corresponding International Application No. PCT/EP2017/075017.
(Continued)

*Primary Examiner* — James R Bidwell
(74) *Attorney, Agent, or Firm* — Walter | Haverfield LLP; Sean F. Mellino; D. Peter Hochberg (57) ABSTRACT

A container-handling installation and a method for conveying functional elements in a container-handling installation for handling containers is provided. The container-handling installation comprises at least two conveying elements, which each have at least one functional element provided for handling containers. A conveyance path is provided for conveying the at least two conveying elements one after the other, and independently of one another, along the conveyance path and by conveyance-path magnetic-force units, which are arranged along the conveyance path and at least some of which can be activated separately in order to interact with at least one magnetic-force unit of the respec-
(Continued)

tive conveying element A bearing unit is provided for each conveying element for bearing the conveying element such that the at least two conveying elements are mounted on a common shaft.

15 Claims, 5 Drawing Sheets

(51) Int. Cl.
*B65G 54/02* (2006.01)
*B65G 47/84* (2006.01)

(58) Field of Classification Search
USPC .................................. 198/478.1, 472.1, 805
See application file for complete search history.

(56) References Cited

U.S. PATENT DOCUMENTS

| | | | | |
|---|---|---|---|---|
| 4,570,782 | A * | 2/1986 | Cargill | B65G 29/00 198/345.3 |
| 6,112,880 | A * | 9/2000 | Flix | B65G 47/082 198/419.2 |
| 6,334,523 | B1 | 1/2002 | Fukunaga | |
| 6,349,818 | B1 * | 2/2002 | Spatafora | B65B 19/10 198/805 |
| 6,876,107 | B2 * | 4/2005 | Jacobs | B60L 15/38 310/12.19 |
| 8,844,708 | B2 * | 9/2014 | Winter | B65C 9/16 198/470.1 |
| 9,008,831 | B1 * | 4/2015 | Jacobs | B65G 47/52 700/217 |
| 9,604,795 | B2 * | 3/2017 | Aumann | B65G 54/02 |
| 2012/0285800 | A1 * | 11/2012 | Kraus | B65G 47/847 198/478.1 |
| 2013/0168206 | A1 * | 7/2013 | Winter | B65C 9/16 198/470.1 |
| 2014/0331888 | A1 | 11/2014 | Wernersbach et al. | |

FOREIGN PATENT DOCUMENTS

| | | |
|---|---|---|
| DE | 102012103378 A1 | 10/2013 |
| DE | 102012223173 A1 | 6/2014 |
| DE | 102014214107 A1 | 2/2015 |
| DE | 102013218391 A1 | 3/2015 |
| EP | 2610189 A1 | 7/2013 |
| JP | 5995042 B2 | 9/2016 |

OTHER PUBLICATIONS

Written Opinion from ISA/EP dated Jan. 15, 2018 for corresponding International Application No. PCT/EP2017/075017.

International Preliminary Report on Patentability and Translation of Written Opinion of the International Searching Authority dated Jul. 30, 2019 for corresponding International Application No. PCT/EP2017/075017.

* cited by examiner

CONTAINER-HANDLING INSTALLATION AND METHOD FOR CONVEYING FUNCTIONAL ELEMENTS IN A CONTAINER-HANDLING INSTALLATION FOR THE PURPOSE OF HANDLING CONTAINERS

CROSS-REFERENCE TO RELATED APPLICATIONS

This application a 371 National Stage application of International Application No. PCT/EP2017/075017 filed on Oct. 2, 2017, which claims foreign priority to German (DE) Application Serial No. 10 2017 101 331.8 filed on Jan. 24, 2017, the contents of both of which are incorporated herein by reference in their entireties.

BACKGROUND OF THE INVENTION

Field of the Invention

The present invention relates to a container-handling installation and a method for conveying functional elements in a container-handling installation for handling containers, such as conveying containers, ejecting containers from a holding and/or conveying device; gripping labels for containers, labeling containers, etc.

Description of the Prior Art

Container-handling installations are used for handling containers, such as bottles, cans, etc., in order to prepare the containers for receiving a product, such as a beverage, a detergent, a cosmetic product, a piece good, such as a cloth, rods, etc., and/or to package the containers in packaging units.

In the container-handling installation, rotating machine components are used, which perform various actions. Such a machine component may for example be a transfer star for conveying containers or a gripper cylinder for conveying labels in cold glue units and aggregates for wrap-around labeling from a roll. In such machine components, the functional elements for handling the containers or labels, etc. are usually rigidly mounted on a rotating disk or a rotating cylinder. Due to the rigid positioning, the pitch or the distance or the space between the functional elements is not changeable. Therefore, production can only be done with limited flexibility.

In order to overcome this disadvantage, it has been considered using a circular long stator linear motor on which several conveying elements or wagons or movers run. On these conveying elements, the functional elements are attached. In this way it is possible to realize different speeds and pitches during one revolution of the conveying elements on the long stator. In addition, if necessary, a change of a gripper cylinder can be omitted when retrofitting to another container, since the control of the conveying elements can be adjusted for each container to be processed or each label to be processed.

A disadvantage of such a concept is that each conveying element with several rollers per conveying element must be supported separately in order to allow a stable and secure guidance of the conveying element on the long stator. The problem with such a configuration is that the rollers are subject to high wear due to the high run time. This results in a very high maintenance effort and consequently high costs. In addition, a rail for precise guidance of the conveying elements is needed, which causes further costs.

Another problem is that relatively delicate rollers are used for the conveying elements. This is partly critical due to high normal forces between the conveying element and the long stator.

SUMMARY OF THE PRESENT INVENTION

It is therefore an object of the present invention to provide a container-handling installation and a method for conveying functional elements in a container-handling installation for handling containers, with which the aforementioned problems can be solved. In particular, a container-handling installation and a method for conveying functional elements in a container-handling installation for handling containers are to be provided, in which functional elements on a rotating machine component are precisely controllable with high flexibility for various production tasks and are movable inexpensively in construction and in operation.

This object is achieved by a container-handling installation according to the present invention. The container-handling installation has at least two conveying elements, each having at least one functional element, which is provided for handling containers, a conveyance path for conveying the at least two conveying elements successively and independently of one another along the conveyance path and by means of conveyance path magnetic force units which are positioned along the conveyance path and which are at least partially separately controllable in order to interact with at least one magnetic force unit of the respective conveying element, and a bearing unit for each conveying element for mounting the conveying element such that the at least two conveying elements are mounted on a common shaft.

The container-handling installation is advantageously configured such that the conveying elements are subject to a low wear due to their contactless bearing on the conveyance path. In addition, the conveying elements can be controlled as needed and precisely to the desired positions, in particular stations for performing a function with the functional element, on the conveyance path. Thus, the container-handling installation is very flexible adjustable to the respective production requirements or adaptable to the respective production requirements.

Moreover, the combination of conveying elements with magnetic force units for the functional elements and the conveyance path magnetic force units has a very simple structure, which comprises only a few simple parts. As a result, the manufacturing costs for the container-handling installation are comparatively low. In addition, the maintenance is required at much longer intervals than in the prior art, which significantly reduces the maintenance costs compared to the prior art.

In addition, the problems due to the high normal forces between the conveying element and stator are solved by eliminating the rollers of the magnetic force units.

As a result, the described configuration of the container-handling installation helps to organize the changeover time or maintenance of the container-handling installation or the individual container-handling machine as simple and fast as possible. This also contributes to minimizing downtimes and production losses due to the configuration of the container-handling installation.

Advantageous further embodiments of the container-handling installation are specified in the dependent claims.

Possibly, the container-handling installation further has the shaft for receiving the bearing units for all conveying elements. Additionally or alternatively, the conveyance path is configured circular or arcuate and the bearing units for the at least two conveying elements are positioned in the center of the conveyance path on the shaft. Additionally or alternatively, the bearing unit comprises a rolling bearing and/or a slide bearing and/or magnetic bearing.

It is also conceivable that the at least two conveying elements are positioned in noncontact with the bearing unit on the conveyance path. Additionally or alternatively, each conveying element is faced in noncontact to the conveyance path on at least two sides.

In a preferred implementation, each conveying element is coupled to a first arm and a second arm at the free end of each arm is positioned a part of the bearing unit of the conveying element. Herein, it is preferable that the arms are spaced apart from each other so that all the first arms for the at least two conveying elements are positioned on the free end of the first arm in a row adjacent to each other on the shaft.

In one implementation, the conveyance path can comprise as conveyance path magnetic force units a plurality of coils which are individually controllable. Additionally or alternatively, a control device is also provided for controlling a movement of at least one conveying element along the conveyance path at a speed that is at least partially different from a speed of the at least one other conveying element.

According to various embodiments, the magnetic force unit of the conveying element comprises a first magnetic force element and a second magnetic force element, wherein the first magnetic force element interacts with at least one conveyance path magnetic force unit for conveying the conveying element along the conveyance path, and wherein the second magnetic force element interacts with at least one other conveyance path magnetic force unit independent from the first magnetic force element for moving a functional element or a lever of the conveying element, to effect an actuation of the functional element or the lever. Herein, the first magnetic force element may comprise at least one permanent magnet or magnetizable material, and the second magnetic force element may comprise at least one permanent magnet or magnetizable material.

Possibly, the lever is pivotally supported on the conveying element and connected to the functional element on the conveying element. Additionally or alternatively, the lever is positioned in the conveying direction lagging or leading to the conveying element. Additionally or alternatively, the lever is shaped such that the lever is receivable by another conveying element, which is positioned adjacent to the conveying element on the conveyance path.

According to one embodiment, the conveying element has a recess which is positioned in a direction transverse to the conveying direction approximately in the center of the conveying element. Optionally, the conveying element has a piezo motor which provides electrical energy for a functional element by interaction with at least one conveyance path magnetic force unit.

It is possible for the conveyance path and the at least two conveying elements to be part of a conveying device and/or a blow molding machine and/or an equipment machine and/or a filling machine and/or an inspection unit and/or a marking unit and/or a packaging machine and/or a supplying unit for piece goods such as preforms or closures.

The aforementioned object is also achieved by a method for conveying functional elements in a container-handling installation for handling containers according to the present invention. In the method, at least two conveying elements, each having at least one functional element, provided for handling containers are conveyed one after the other and independently of one another along the conveyance path by means of conveyance path magnetic force units which are positioned along the conveyance path and which are at least partially separately controllable in order to interact with one magnetic force unit of the respective conveying element, wherein each conveying element is mounted with a bearing unit such that the at least two conveying elements are mounted on a common shaft.

Further possible implementations of the invention also include not explicitly mentioned combinations of features or implementations described above or below with regard to the embodiments. The skilled person will also add individual aspects as improvements or additions to the respective basic form of the invention.

BRIEF DESCRIPTION OF THE DRAWINGS

The invention is described below with reference to the accompanying drawings and on the basis of embodiments.

DETAILED DESCRIPTION OF THE PRESENT INVENTION

In the figures, identical or functionally identical elements are provided with the same reference numerals, unless stated otherwise.

In the figures, identical or functionally identical elements, unless otherwise indicated, are provided with the same reference numerals.

Figure 1:
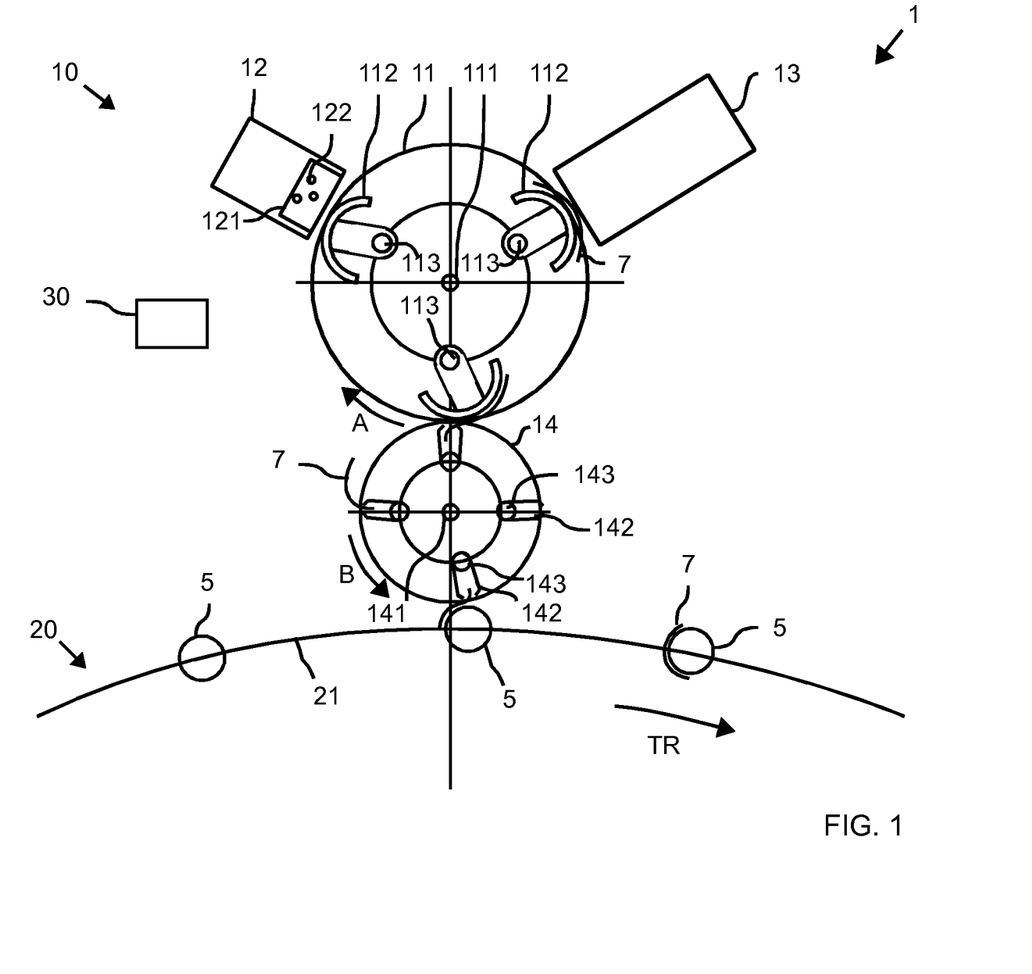
FIG. 1 shows a simplified schematic plan view of a container-handling installation for handling containers.

FIG. 1 shows very schematically a container-handling installation 1 for handling containers 5, namely in the specific example shown for conveying the containers 5 and attaching a label 7 to the containers 5 or labeling the containers 5. For this purpose, the container-handling installation 1 has a labeling machine 10, 20 with a labeling unit 10 for attaching the label 7 and a conveying device 20 for conveying the containers 5 to the labelling aggregate 10 and for conveying the containers 5, which are provided or labeled with the label 7, away from the labelling aggregate 10. The container-handling installation 1 is controlled by at least one control device 30, which is shown only very schematically in FIG. 1. The containers 5 may be bottles, cans, packages, etc. In addition, the material of the container 2 can be freely selected, such as glass, plastic, aluminum, etc.

The labeling unit 10 has a pallet carousel 11, a gluing device 12, a label providing device 13 and a gripper cylinder 14.

The pallet carousel 11 is rotatable or turnable about a pallet carousel axis 111 in a rotating direction A. At the pallet carousel 11, a plurality of pallets 112 are positioned, which are coupled to the pallet carousel 11 such that the pallets 112 rotate with the pallet carousel 11 in the first rotating direction A. In addition to the rotation or turning in the rotating direction A, the pallets 112 can rotate or oscillate or be pivoted back and forth at least partially about a pallet axis 113, where the pallets 112 are mounted on the pallet carousel 11. On the outside of the pallet carousel 11, the gluing device 12, which has a glue roller 121 for applying glue 122 to the pallets 112, and the label providing device 13 are positioned one after the other in this direction in the rotating direction A.

In the labeling operation, the pallets 112 are moved by a rotation of the pallet carousel 11 about its axis 111 past the gluing device 12 and thereby loaded by the gluing device 12 with glue 122. Subsequently, the pallets 112 are moved by the rotational movement of the pallet carousel 11 in the first rotating direction A to the label providing device 13, at which the label 7 is transferred to the pallet 12 to which the glue is applied. The labels 7 are thereby removed from the label providing device 13 by the glue 122 applied on the pallet 112 and moved with the pallet carousel 11 further in the first rotating direction A to the gripper cylinder 14. The label providing device 13 operates both as storage and for the transfer of the respective label 7 to one of the pallets 112.

After the label providing unit 13, the pallets 112 to which the label 7 is loaded are moved past the gripper cylinder 14. The gripper cylinder 14 is also positioned on the pallet carousel 11. Also, the gripper cylinder 14 is rotatable, namely, about a gripper cylinder axis 141 in a second rotational direction B. Herein, the pallet carousel 11 and the gripper cylinder 14 move in the same direction at the point where they face each other.

On the gripper cylinder 14, four grippers 142 are positioned in the example shown. The grippers 142 are coupled to the gripper cylinder 14 such that the grippers 142 can rotate with the gripper cylinder 14 in the second rotating direction B. In addition to the turn or rotation in the rotating direction B, each gripper 142 can rotate or be moved at least partially about a gripper axis 143, on which the gripper 142 is mounted on the gripper cylinder 14. The movement about the gripper axis 143 causes the gripper 142 to open or close to grip or release a label 7.

By the movement of the conveying device 20 in the conveying direction TR along a conveyance path 21, the containers 5 are moved past the gripper cylinder 14. Herein, the labels 7 are removed by the gripper 142 from the pallet 112 and moved by the rotational movement of the gripper cylinder 14 in the second rotating direction B and then transferred to a container 5 conveyed by the conveying device 20. When removing the label 7 from the pallet 112 by the gripper 142, the glue 122, which was applied in a previous step on the pallet 112, remains adhered to the label 7. In addition, the gripper cylinder 14 and the conveying device 20 move in the same direction at the position where they face each other, as illustrated in FIG. 1. As a result, the containers 5 are provided or labeled with the labels 7.

Although not shown in FIG. 1, the container-handling installation 1 may include other machines for handling the containers 5, such as a blow molding machine for producing plastic bottles as a container 5 from preforms, a filling machine for filling a product into the containers 5, an inspection machine or inspection unit for inspecting the containers 5 for defects, a marking machine or marking unit for marking at least a part of the containers 5 with a predetermined mark, a packaging machine for packaging the containers into predetermined packages, such as bundles or boxes. Any combinations or any positioning of the machines are/is possible. Of course, other machines for handling the containers 5 or any number of the aforementioned machines can be used.

Figure 2:
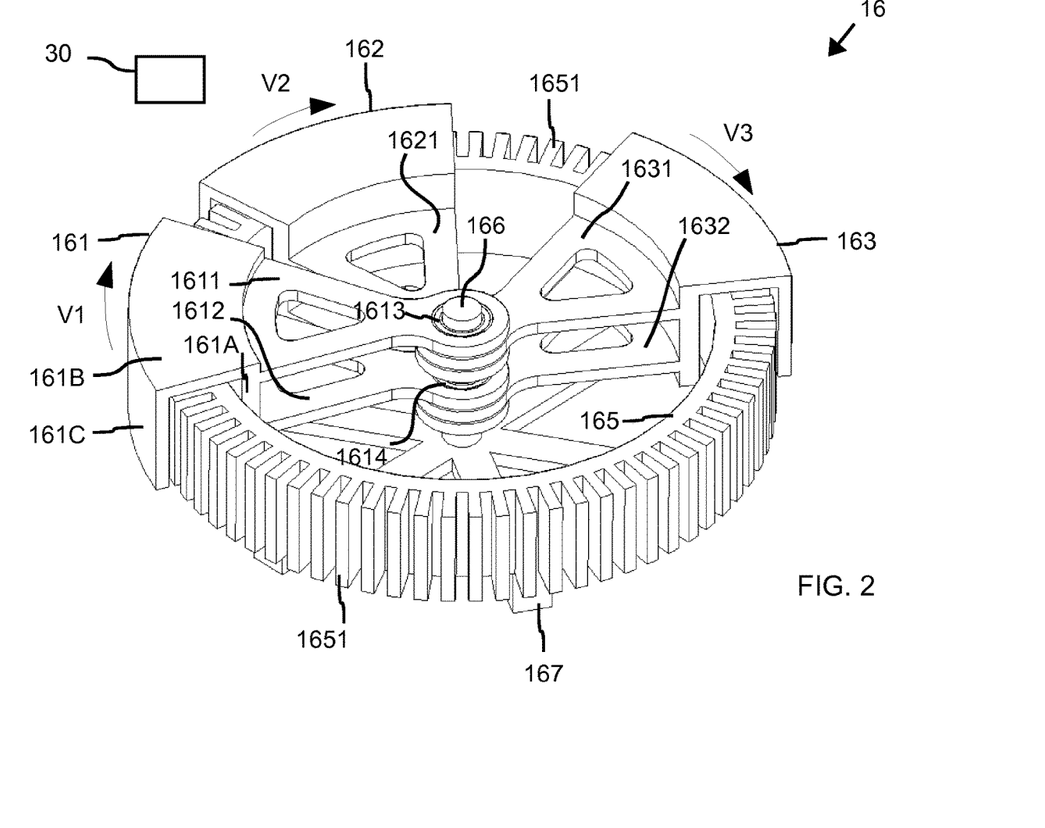
FIG. 2 shows a three-dimensional view of a motor for the container-handling installation according to a first embodiment.

FIG. 2 shows a motor 16, which is configured for moving functional elements, such as the grippers 142 on the gripper cylinder 14 or the pallets 112 on the pallet carousel 11 or the container grippers of the conveying device 20 along the conveyance path 21, etc. The container grippers may in particular be vacuum suction apparatus or be neck handling clamps or clamps which are used to grip the containers 5, such as bottles, for example, at their neck or body. The conveying device 20 may in particular be a pitch separation star located between two machines, in particular the blow molding machine and the filling machine or the filling machine and the labeling machine 10, 20 or the blow molding machine and the labeling machine 10, 20, or the pitch separation star can be installed within a machine, for example, in a stretch blow molding machine between a heating module and a blowing module, etc. In all cases mentioned, the labeling machine 10, 20 may additionally or alternatively comprise or be a printing machine. In addition, the conveying device 20 can be positioned as a pitch separation star between the mentioned machines and an inspection unit or a marking unit.

As described below, the motor 16 is configured to realize a change in the distance or the pitch between containers 5, because the container-handling installation 1, for example, is to be changed between other products, in particular different sized containers 5, labels 7, etc. Thus, the motor 16 can be used wherever it makes sense to perform a circular motion, with changing speeds and distances or pitches. However, it may also be possible that a movement is performed along in particular an ellipse or only partially along an arc segment, to which follows, for example, a straight-line conveyance path, etc.

For this purpose, the motor 16 of FIG. 2 has a first conveying element 161, a second conveying element 162, a third conveying element 163, which form the rotors of the motor 16. In addition, the motor 16 has a conveyance path 165 which comprises a plurality of individually drivable conveyance path magnetic force units 1651 as a stator or primary part of the motor 16. The conveyance path 165 is positioned around a shaft 166 of the motor 16. The conveyance path 165 is supported by a frame 167. The frame 167 may also support/mount the shaft 166.

At the first to third conveying element 161, 162, 163, at least one of the functional elements, such as the grippers 142 on the gripper cylinder 14 or the pallets 112 on the pallet carousel 11 or container gripper of the conveying device 20 can be positioned rigidly or else movably, as described above. The first to third conveying elements 161, 162, 163 form as rotors the secondary parts of the motor 16.

The conveyance path 165 is in particular an iron core with teeth, as shown in FIG. 2. Herein, the conveyance path 165, which is equivalently formed to the path/course of the conveying elements 161, 162, 163, is given by the support by the shaft 166. In other words, the stator of the motor 16 follows the path/course of the conveying elements 161, 162, 163.

The conveyance path magnetic force units 1651 are configured as individual teeth on the conveyance path 165.

The conveyance path magnetic force units 1651 are, in particular, coils wound around the teeth of the iron core of the conveyance path 165. The iron core may consist of ferromagnetic material. Even if the windings of the coils can be located on all teeth of the iron core, only every nth tooth can be equipped with a coil, where n is a natural number greater than 1. The coils can be individually flowed under the control of the control device 30 by an electric current, whereby a magnetic force which acts on the conveying elements 161 to 163 is induced in the coils. Thus, the coils are individually or at least partially separately or individually drivable or controllable to cooperate with a magnetic force unit of the respective conveying element 161, 162, 163.

The conveyance path 165 forms a bent stator of the motor 16. In the specific example shown in FIG. 2, the conveyance path 165 forms a circle from which the conveyance path magnetic force units 1651 project outward. The first to third conveying elements 161 to 163 are independently movable relative to the conveyance path 165 by correspondingly driving the coils under the respective conveying elements 161 to 163 to produce the aforementioned magnetic force. For this purpose, the first to third conveying element 161 to 163 are at least partially formed as a magnetic force unit. The magnetic force unit of the first to third conveying element 161 to 163 may be formed, for example, as at least one permanent magnet or magnetizable material. Alternatively, however, at least one magnetic-force unit of the first to third conveying elements 161 to 163 may also be formed as a coil.

As a result, the first conveying element 161 can move at a first speed V1 on the conveyance path 165, wherein an arrow indicates the conveying direction as an example. The second conveying element 162 can move at a second speed V2 on the conveyance path 165, wherein an arrow indicates the conveying direction as an example. The third conveying element 163 can move at a third speed V3 on the conveyance path 165, wherein an arrow indicates the conveying direction as an example. The speeds V1 to V3 can be equal as needed at least at times. However, at least two of the speeds V1 to V3 can also be at least temporarily different in size. Of course, the speeds V1 to V3 are preferably chosen such that there is no unintentional collision between at least two conveying elements 161 to 163 moving successively on the conveyance path 165. Preferably, therefore, the conveying directions of the conveying elements 161 to 163 are the same. However, the conveying directions of the conveying elements 161 to 163 may also be temporarily opposite.

The first conveying element 161 has two arms 1611, 1612, wherein a bearing element 1613 is positioned at a free end of the first arm 1611 and a bearing element 1614 is positioned at a free end of the second arm 1612. The first bearing element 1613 and the second bearing element 1614 form a bearing unit 1613, 1614, which may in particular comprise a rolling bearing and/or slide bearing and/or magnetic bearing. At the other end of the arms 1611, 1612, a first portion 161 A of the first conveying element 161 is positioned, which faces the conveyance path 165. The first section 161A of the first conveying element 161 is thus positioned on the inner circle of the conveyance path 165, in particular parallel to the axial direction of the shaft 166. The first conveying element 161 surrounds the conveyance path 165 on three sides of the conveyance path 165. Thus, the first conveying element 161 has a U-shaped cross section in the region of the conveyance path 165. Herein, a second section 161B of the conveying element 161, which forms the bottom of the U-shaped cross section, connects the first section 161A and a third section 161B of the first conveying element 161. The second section 161B of the conveying element 161 is positioned in the radial direction of the motor 16. The third section 161C faces the conveyance path magnetic force units 1651. Thus, the third section 161C of the first conveying element 161 is positioned on the outer circle of the motor 16 or the conveyance path magnetic force units 1651, in particular parallel to the axial direction of the shaft 166.

Figure 3:
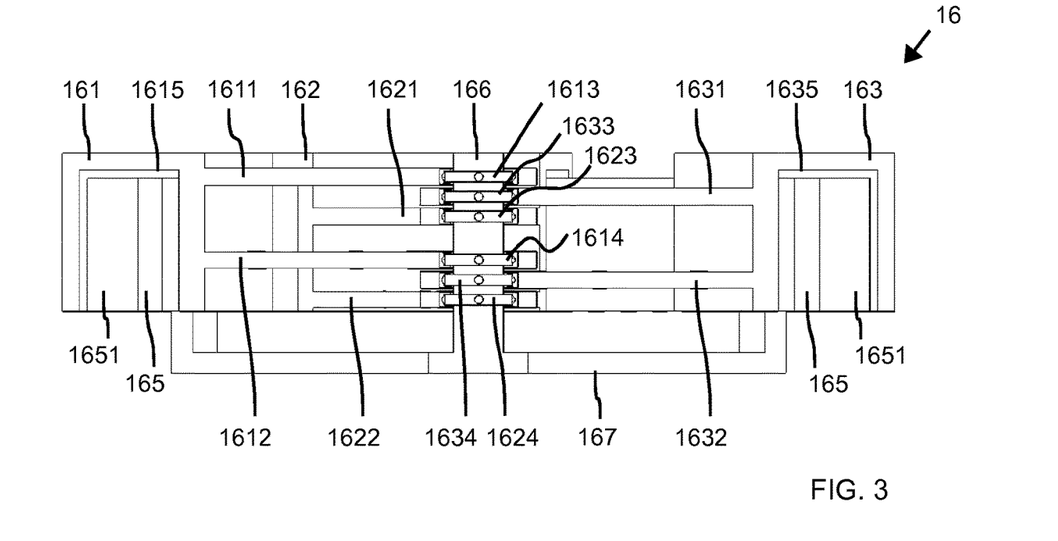
FIG. 3 shows a section through the motor for the container-handling installation according to the first embodiment.

The second conveying element 162 has two arms 1621, 1622, as seen in FIG. 2 in conjunction with FIG. 3. In this case, a first bearing element 1623 is positioned at a free end of the first arm 1621 and a second bearing element 1624 is positioned at a free end of the second arm 1622. The first bearing element 1623 and the second bearing element 1624 form a bearing unit 1623, 1624. Apart from that, the second conveying element 162 is executed in the same way as described above for the first conveying element 161.

The third conveying element 163 has two arms 1631, 1632, wherein a first bearing element 1633 is positioned at a free end of the first arm 1631 and a second bearing element 1634 is positioned at a free end of the second arm 1632, as also seen in FIG. 2 in conjunction with FIG. 3. The first bearing element 1633 and the second bearing element 1634 form a bearing unit 1633, 1634. Apart from that, the third conveying element 163 is executed in the same way as described above for the first conveying element 161.

Taken as a whole, therefore, the conveying elements 161, 162, 163 are each wedge-shaped. The arms 1611, 1612 are spaced apart from each other, so that one arm of the other conveying elements 162, 163, respectively, can be positioned between the arms 1611, 1612, as illustrated in FIG. 2 and FIG. 3. The same applies to the arms of the conveying elements 162, 163. The arms 1611, 1612 and the arms of the conveying elements 162, 163 may be formed between the shaft 166 and the conveyance path 165 with braces, as shown in FIG. 2.

In addition, according to the example of FIG. 2, all bearing elements described above are positioned in the axial direction of the shaft 166 side by side on the shaft 166. Thus, all conveying elements 161, 162, 163 of the motor 16 of FIG. 2, in particular exclusively, are mounted on the shaft 166.

As shown in more detail in FIG. 3 than in FIG. 2, the first conveying element 161 is positioned spaced apart from the conveyance path 165 and its conveyance path magnetic force units 1651 through a gap 1615. As a result, the first conveying element 161 is mechanically mounted without contact on the conveyance path 165 by the bearing unit 1613, 1614. In other words, the bearing unit 1613, 1614 mechanically supports the first conveying element 161 on the shaft 166 such that the first conveying element 161 floats on the conveyance path 165. This results in that there is no friction between the first conveying element 161 and the conveyance path 165 when there is a relative movement between the first conveying element 161 and the conveyance path 165. The same applies to the conveying elements 162, 163, although only a corresponding gap 1635 for the third conveying element 163 is shown in detail in FIG. 3.

Thus, by the conveying elements 161 to 162, the functional elements, such as the gripper 142 of FIG. 1, etc., are mounted on a shaft 166. The conveying elements 161 to 162 move with appropriate action of a magnetic force along the conveyance path 165 which is positioned at least partially arcuately around the shaft. The conveying elements 161, 162, 163 and thus the functional elements received thereon are thus mounted only on the shaft 166 and independently of each other. Herein, the respective conveying element 161, 162, 163 is at least partially positioned between the conveyance path 165 and the associated bearing unit of the respective conveying element 161.

In operation of the container-handling installation 1 or the motor 16, a method for conveying functional elements in a container-handling installation 1 for handling containers 5 is carried out by conveying the conveying elements 161, 162, 163 successively and, as needed, independently from each other along the conveyance path 165 between different stations on the conveyance path 165 and by means of the conveyance path magnetic force units 1651 positioned along the conveyance path 165. In this case, the conveying elements 161, 162, 163 can also be temporarily stopped at certain positions or stations on the conveyance path 165.

Preferably, the conveying elements 161, 162, 163 can be attached to the shaft 166 with a quick-release fastener. As a result, by attaching more or fewer than three conveying elements 161, 162, 163, the number of conveying elements 161, 162, 163 can be easily changed.

Thus, the motor 16 forms a linear motor, which is configured to be particularly simple and low-wear. In the example shown in FIG. 2, the motor 16 is configured as an external rotor motor.

In a modification of the present embodiment, the motor 16 is configured as an internal rotor motor. In this case, the conveyance path 165 is positioned on the outer circle of the motor 16 and the teeth of the conveyance path magnetic force units 1651 project in the direction of the shaft 166. In this case, the first conveying element 161 may be formed on the associated arms 1611, 1612 only as a plate faced to the conveyance path magnetic force units 1651. The second and third conveying elements 162, 163 may be configured accordingly. It is alternatively possible for at least one of the first to third conveying elements 161 to 163 to have an L-shaped cross section, in which only the first and second sections 161A, 161B are present, and thus a section of the corresponding conveying element 161 to 163 projects outwardly at least partially radially beyond the conveyance path magnetic force units 1651.

Figure 4:
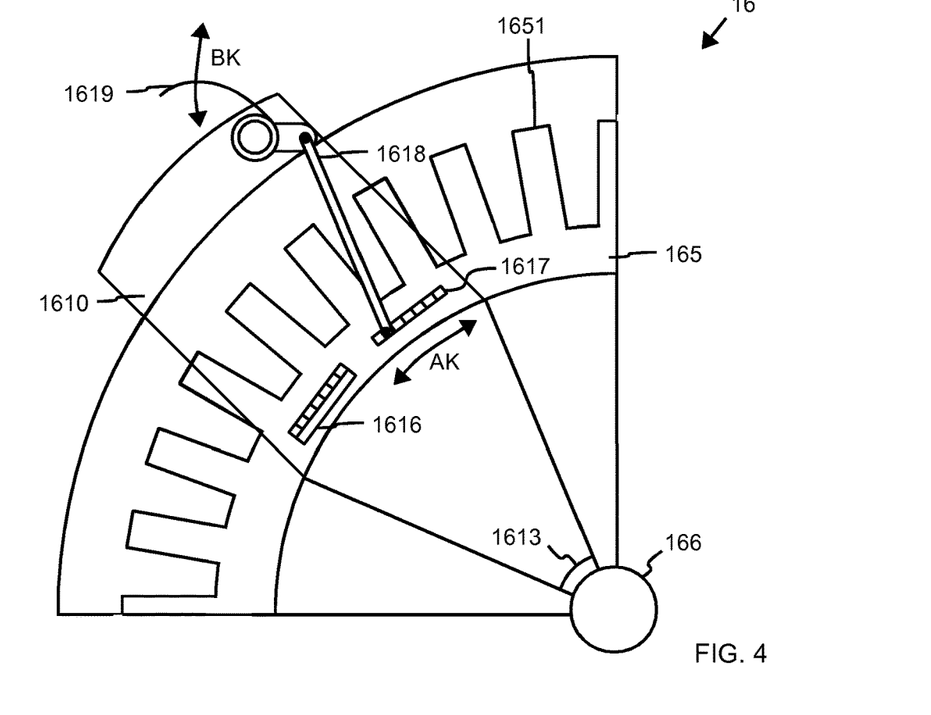
FIG. 4 is a plan view of a part of a motor with a conveying element according to a second embodiment.

FIG. 4 illustrates the structure of a conveying element 1610 according to a second embodiment. The conveying element 1610 is largely carried out in the same way as the conveying element 161 or the conveying elements 162, 163 according to the first embodiment. Therefore, only the differences from the first embodiment will be described below.

The conveying element 1610 has a magnetic force unit with a first magnetic force element 1616 and a second magnetic force element 1617. In addition, a coupling element 1618 is provided, which couples the second magnetic force element 1617 with a gripper finger 1619 as a functional element during or for handling containers 5 (FIG. 1).

The first magnetic force element 1616, which may be implemented as at least one permanent magnet or magnetizable material, serves to move the conveying element 1610 relative to the conveyance path 165. In contrast thereto, the second magnetic force element 1616, which may be implemented as at least one permanent magnet or magnetizable material, serves for moving the coupling element 1618 along a segment AK on the conveying element 1610. By the movement, the gripper finger 1619 is moved in a movement direction BK.

For the described movements of the conveying element 1610 and the gripper finger 1619, the magnetic force elements 1616, 1617 are controlled or driven independently of each other. For this purpose, the conveyance path magnetic force units 1651 positioned at the respective magnetic force elements 1616, 1617 are driven accordingly.

The illustrated transfer of the force of the conveyance path magnetic force unit (s) 1651 from the magnetic force element 1617 to the gripper finger 1619 is conceivable in various ways. For this purpose, the coupling element 1618 is just one example of various other versions. In particular, also the magnetic force elements 1616, 1617 may be displaceable relative to one another in order to carry out the mechanical movement, for example the movement of the gripper finger 1619 described above.

For example, a slight movement of the magnetic force element 1617 on the conveyance path 165 can be transformed into a larger movement of the gripper finger 1619 or any other functional element.

In addition, it is also possible that the magnetic force elements 1616, 1617, different from the specific example of FIG. 4, have different geometries. It is also conceivable that the magnetic force elements 1616, 1617 overlap at least partially. Additionally or alternatively to the overlap, a height offset between the magnetic force elements 1616, 1617 is possible.

Figure 5:
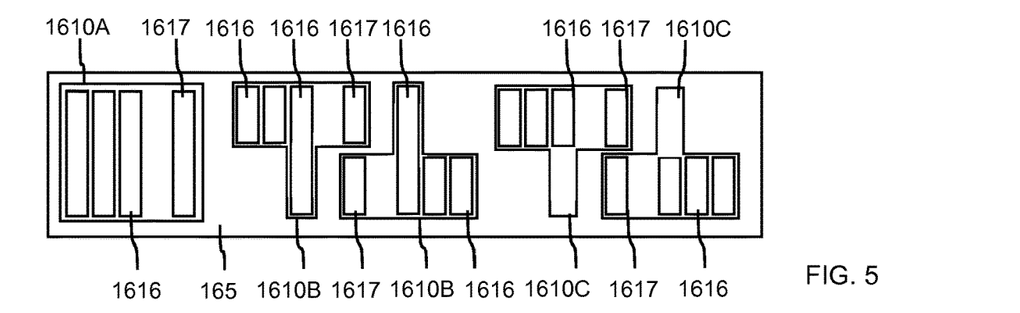
FIG. 5 shows a plan view of three variants for a shape of the conveying element according to the second embodiment.

FIG. 5 illustrates three different variants for a configuration of the conveying element 1610 with respect to the positioning of the magnetic force units 1616, 1617 on the conveying element 1610. The magnetic force elements 1616 may have alternating polarities.

Accordingly, according to a first variant in a conveying element 1610A, all magnetic force elements 1616, 1617 are the same length, namely, are about as long as the conveyance path 165 is high. As a result, the conveying element 1610A has a rectangular shape in the area of the magnetic force elements 1616, 1617.

In a second variant of a conveying element 1610B, however, one of the magnetic force elements 1616 is approximately twice as long as the other magnetic force elements 1616, 1617. As a result, the conveying element 1610B has a rectangular shape in the area of the magnetic force elements 1616, 1617. In addition, juxtaposed or adjacent conveying elements 1610B are positioned opposite to each other, whereby the conveying elements 1610B can move into each other, as shown in FIG. 5. In this case, it is preferable to maintain a distance between the two conveying elements 1610B, as shown in FIG. 5, so that undesirably strong magnetic interactions between the magnetic force elements 1616, 1617 are avoided. The directly adjacent magnetic force elements 1617 then interact with the same conveyance path magnetic force unit 1651. This results in the possibility of very small distances or spaces between the individual conveying elements 1610B. The magnetic force elements 1616 may have alternating polarities.

In a third variant of a conveying element 1610C, the conveying element 1610C is also T-shaped as the conveying element 1610B. However, here all the magnetic force elements 1616, 1617 are the same length. As a result, all the magnetic force elements 1616, 1617 are only half as long as the conveyance path 165 is high. Also in this variant, very small distances or spaces between the individual conveying elements 1610B are possible.

Although a clearance between the magnetic force elements 1616, 1617 is shown in FIG. 5, the magnetic force elements 1617 can also be positioned directly next to one of the magnetic force elements 1616, as far as the magnetic force elements 1616, 1617 do not influence each other. In this case, even smaller distances or spaces between the individual conveying elements 1610B are possible as shown in FIG. 5.

Figure 6:
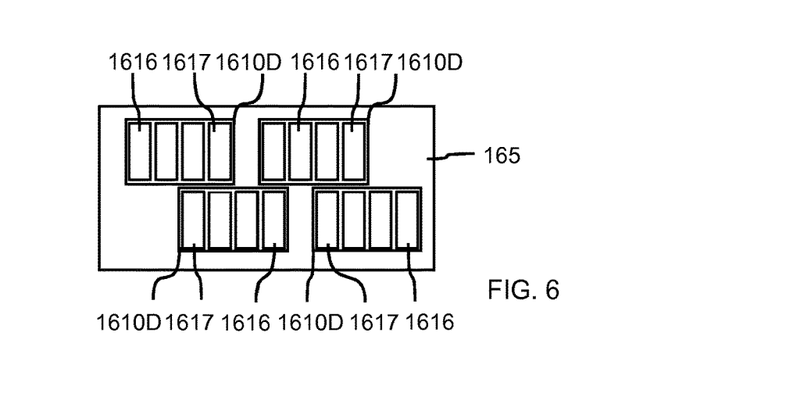
FIG. 6 is a plan view of a fourth variant of a form of the conveying element according to the second embodiment.

In a fourth variant of a conveying element 1610D according to FIG. 6, the conveying elements 1610D have only about half the height of the conveyance path 165. Even then, driving into each other is possible.

Figure 7:
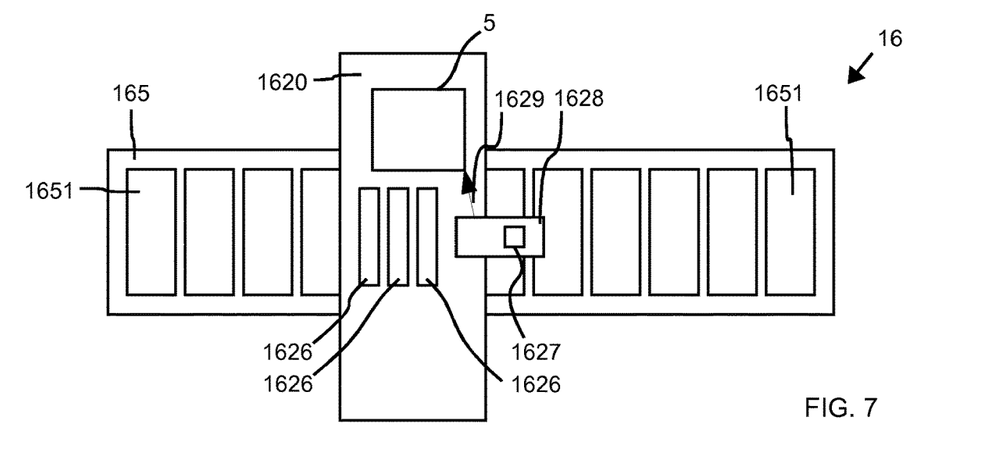
FIG. 7 to FIG. 9 each show different plan views of a part of a motor with a conveying element according to a third embodiment.
Figure 8:
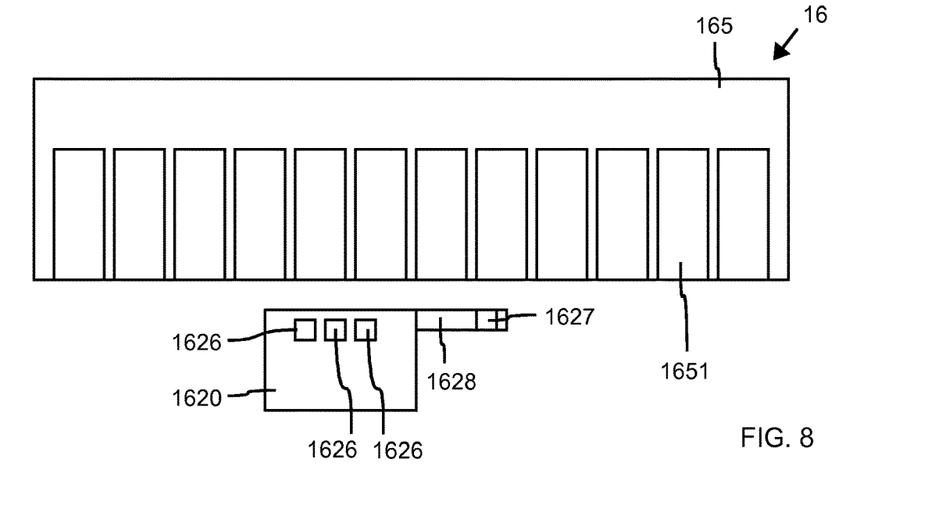

FIG. 7 illustrates the structure of a conveying element 1620 according to a third embodiment. For this purpose, FIG. 7 very schematically shows a part of the motor 16 in a plan view of the conveyance path magnetic force units 1651 on the outer circumference of the motor 16. FIG. 8 schematically shows a corresponding plan view of the motor 16.

The conveying element 1620 is largely carried out in the same way as the conveying element 161 or the conveying elements 162, 163 according to the first embodiment. Therefore, only the differences from the first embodiment will be described below.

The conveying element 1620 has a magnetic force unit with three first magnetic force elements 1626 and a second magnetic force element 1627. The second magnetic force element 1627 is disposed on a lever 1628, which is pivotally held on the conveying element 1620. The lever 1628 may be connected to the conveying element 1620 with a functional element 1629 shown here only very schematically. Within the conveying element 1620, transmission and other elements for transmission of motion may be present, which are also not shown.

By moving the lever 1628, for example, an article, in particular, a container 5, etc., may be ejected from the conveying element 1620 by opening a clamp holding the article with the lever 1628. The article may change its orientation by pivoting a clamp by the lever 1628. For example, when filling on a rotary machine, a container 5 as the article can be pivoted in this way "in the direction of centrifugal force". As a result, overflow of liquid can be avoided.

For the described movements of the conveying element 1620 and the lever 1628, the magnetic force elements 1626 are controlled independently of the magnetic force element 1627. For this purpose, the conveyance path magnetic force units 1651 positioned at the respective magnetic force elements 1626, 1627 are correspondingly driven.

The lever 1628 is positioned either trailing or leading to the conveying element 1620 in the conveying direction.

The lever 1628 may have a shape that allows adjacent conveying element (s) 1620 to enter the lever 1628.

Figure 9:
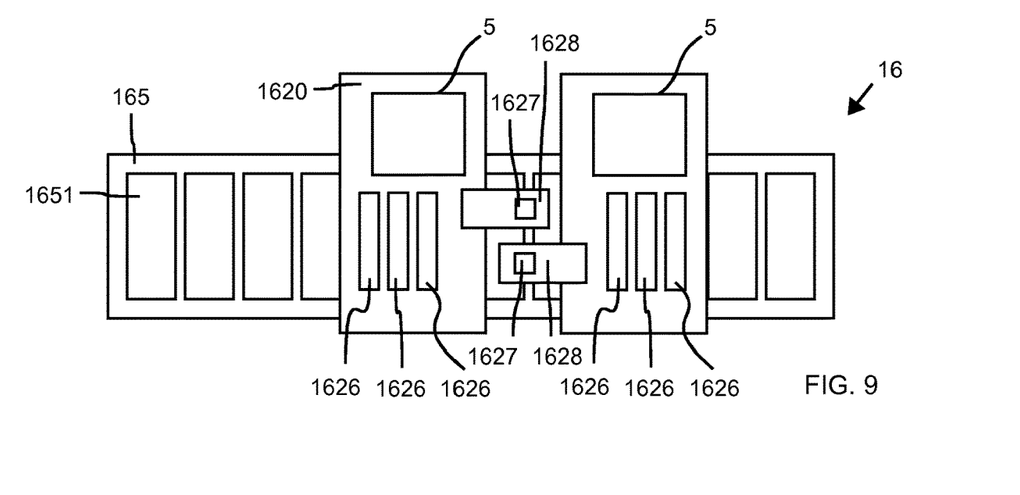

According to FIG. 9, the lever 1628, analogous to the representation of FIG. 5, can use the magnetic field of the conveyance path 165 as a stator on another side, so that other conveying elements 1620 can approach without colliding with the lever 1628. For this purpose, the levers 1628 have a height offset or different distance to the conveyance path 165 in order not to collide, as previously described with reference to FIG. 4.

Taken as a whole, the conveying element 1620 possesses a very large flexibility. For example, it is possible to eject containers 5 there, where it is necessary as needed or desired.

Figure 10:
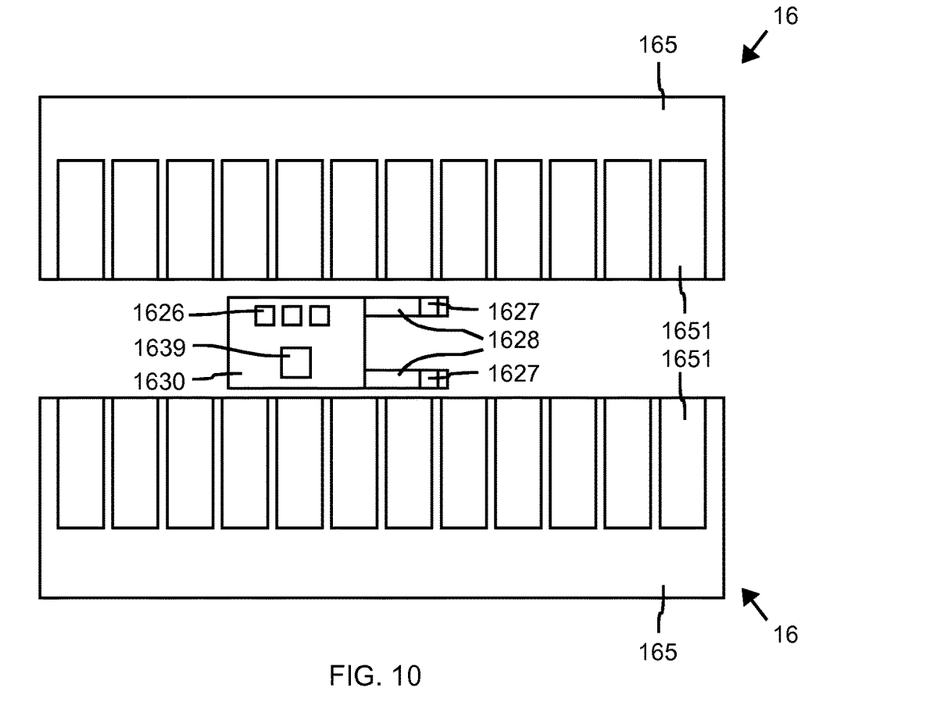
FIG. 10 is a plan view of a part of a motor assembly with a conveying element according to a fourth embodiment.

FIG. 10 illustrates the structure of a conveying element 1630 according to a fourth embodiment. The conveying element 1630 is largely carried out in the same manner as the conveying element 1620 according to the previous embodiment, however, the conveying element 1630 additionally has a second lever 1628 with a magnetic force element 1627, wherein the second lever 1628 is configured in the same manner as the first lever 1628 with magnetic force element 1627.

As a result, in a positioning between two conveyance paths 165 of different motors 16 in the so-called double combing mode, the conveying element 1630 can execute functions with a functional element on both sides of the conveying element 1630, as described above with respect to the preceding exemplary embodiments.

Optionally, the conveying element 1630 has a piezo motor 1639, via which actions can be performed with an electrically operated working element or functional element. For this purpose, the piezo motor is driven by induction of an electric current from the corresponding conveyance path magnetic force unit 1651. The current is in this case induced via a "lever" which is not movable, and the motor 16. In this case, the lever may also be part of the conveying element 1630 itself. Thus, an electrically operated working element can be positioned on the conveying element 1630, which can inductively be supplied with electrical energy. Thereby, electrical energy for a functional element or working element is provided by interaction with at least one conveyance path magnetic force unit 1651.

Figure 11:
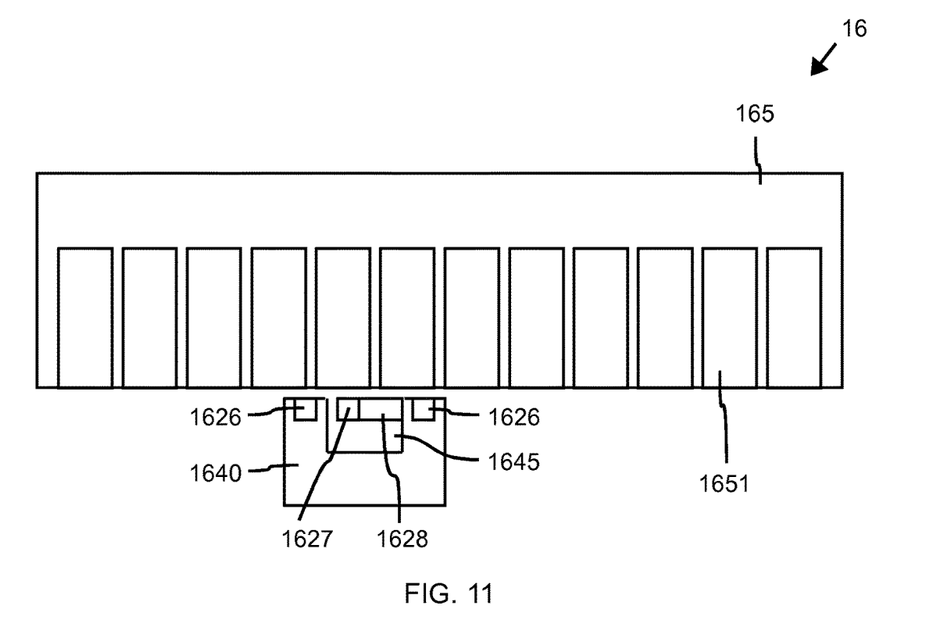
FIG. 11 is a plan view of a part of a motor with a conveying element according to a fifth embodiment.

FIG. 11 illustrates the structure of a conveying element 1640 according to a fifth embodiment. The conveying element 1640 is largely carried out in the same manner as the conveying element 1620 according to the third embodiment. However, in the conveying element 1640, the lever 1828 is positioned with a magnetic force element 1627 in a recess 1645 of the conveying element 1640. In the example shown, the recess 1645 is positioned centrally in the conveying element 1640. Of course, however, (a) recess(es) 1645 outside the center of the conveying element 1640 is/are possible, as well.

Such a positioning enables a very compact and space-saving positioning of the conveying elements 1640 on the motor 16.

All of the previously described embodiments of the container-handling installation 1, the motor 16 and the method carried out by them can be used individually or in all possible combinations. Moreover, in particular, the following modifications are conceivable.

The elements shown in the figures are depicted schematically and may differ in the specific implementation from the forms shown in the figures provided that the above-described functions are ensured.

The number of conveying elements 161 to 163, 1610, 1610A to 1610C, 1620, 1630, 1640 of a motor 16 is arbitrarily selectable.

The configuration of the conveying elements 161 to 163, 1610, 1610A to 1610C, 1620, 1630, 1640 in the form does not have to be the same on a motor 16 for all conveying elements 161 to 163, 1610, 1610A to 1610C, 1620, 1630, 1640.

The piezo motor 1639 may be provided at any one of the conveying elements 161 to 163, 1610, 1610A to 1610C, 1620, 1630, 1640.

LIST OF REFERENCE SIGNS

1 container-handling installation
5 container
7 label
10 labeling
11 pallet carousel
12 gluing device
13 label providing device
14 gripper cylinder
20 conveying device
21 conveyance path 30 control device
111 pallet carousel axis
112 pallet
113 pallet axis
121 glue roller
122 glue
141 gripper cylinder axis
142 gripper
143 gripper axis
161 first conveying element
161A first section of the first conveying element
161B second section of the first conveying element
161C third section of the first conveying element
162 second conveying element
165 conveyance path
166 shaft
167 frame
1610, 1610A to 1610D conveying element
1611, 1612 arm
1613, 1614 bearing element of a bearing unit
1615 gap
1616 first magnetic force element of a magnetic force unit
1617 second magnetic force element of a magnetic power unit
1618 coupling element
1619 gripper fingers (functional element)
1620 conveying element
1621, 1622 arm
1623, 1624 bearing element of a bearing unit
1626 first magnetic force element of a magnetic force unit
1627 second magnetic force element of a magnetic power unit
1628 lever
1629 functional element
1630 conveying element
1631, 1632 arm
1633, 1634 bearing element of a bearing unit
1639 piezo motor
1640 conveying element
1645 recess
1651 conveyance path magnetic force unit
A first rotating direction
AK segment
B second rotating direction
BK movement direction
TR conveying direction
V1 first speed
V2 second speed
V3 third speed Having described preferred embodiments of the invention, it will be apparent to those skilled in the art to which this invention relates, that modifications and amendments to various features and items can be effected and yet still come within the general concept of the invention. It is to be understood that all such modifications and amendments are intended to be included within the scope of the present invention.

The invention claimed is:

1. A container-handling installation, comprising:
at least two conveying elements, each having at least one functional element, which is provided for handling containers;
a conveyance path for conveying the at least two conveying elements successively and independently of one another along the conveyance path and by means of conveyance path magnetic force units which are positioned along the conveyance path and which are at least partially separately controllable in order to interact with at least one magnetic force unit of the respective conveying element;
a bearing unit for each conveying element for mounting the conveying element such that the at least two conveying elements are mounted on a common shaft,
wherein each conveying element is coupled to the first end of a first arm and to a first end of a second arm,
wherein a first bearing element of the bearing unit of the transport element is positioned at the second end of the first arm,
wherein the second end of the first arm is a free end of the first arm,
wherein a second bearing element of the bearing unit of the transport element is positioned at the second end of the second arm, and
wherein the second end of the second arm is a free end of the second arm.

2. The container-handling according to claim 1, further comprising the shaft for receiving the bearing units for all conveying elements; and/or
wherein the conveyance path is configured circular or arcuate and the bearing units for the at least two conveying elements are positioned in the center of the conveyance path on the shaft; and/or
wherein the bearing unit comprises a rolling bearing and/or a slide bearing and/or magnetic bearing.

3. The container-handling installation according to claim 1, wherein the at least two conveying elements are positioned in noncontact with the bearing unit on the conveyance path; and/or
wherein each conveying element is faced in noncontact to the conveyance path on at least two sides.

4. The container-handling installation according to claim 1, wherein the second end of the first arm and the second end of the second arm are positioned spaced to each other on the common shaft.

5. The container-handling installation according to claim 1, wherein the arms are spaced apart from each other so that all the first arms for the at least two conveying elements are positioned on the free end of the first arm in a row adjacent to each other on the shaft.

6. The container-handling installation according to claim 1, wherein the conveyance path comprises as conveyance path magnetic force units a plurality of coils which are individually controllable; and/or
further comprising a control device for controlling a movement of at least one conveying element along the conveyance path at a speed that is at least partially different from a speed of the at least one other conveying element.

7. The container-handling according to claim 1, wherein the magnetic force unit of the conveying element comprises a first magnetic force element and a second magnetic force element;
wherein the first magnetic force element interacts with at least one conveyance path magnetic force unit to convey the conveying element along the conveyance path; and
wherein the second magnetic force element interacts with at least one other conveyance path magnetic force unit independent from the first magnetic force element for moving a functional element or a lever of the conveying element, to effect an actuation of the functional element or the lever.

8. The container-handling installation according to claim 7, wherein said first magnetic force element comprises at least one permanent magnet or magnetizable material; and
wherein said second magnetic force element comprises at least one permanent magnet or magnetizable material.

9. The container-handling installation according to claim 7, wherein the lever is pivotally supported on the conveying element and connected to the functional element on the conveying element; and/or
wherein the lever is positioned in the conveying direction lagging or leading to the conveying element; and/or
wherein the lever is shaped such that the lever is receivable by another conveying element which is positioned adjacent to the conveying element on the conveyance path.

10. The container-handling installation according to claim 1, wherein the conveying element comprises a recess which is positioned in a direction transverse to the conveying direction approximately in the center of the conveying element; and/or
wherein the conveying element comprises a piezo motor which provides electrical energy for a functional element by interaction with at least one conveyance path magnetic force unit.

11. The container-handling installation according to claim 1, wherein the conveyance path and the at least two conveying elements are part of a conveying device and wherein the functional element is a container gripper of the conveying device.

12. The container-handling installation according to claim 11, wherein the container gripper is a vacuum gripper or a neck handling clamp or a clamp which is used to grip one container at its neck or body.

13. The container-handling installation according to claim 1, wherein the conveyance path and the at least two conveying elements are part of a blow molding machine and/or an equipment machine and/or a filling machine and/or an inspection unit and/or a marking unit and/or a packaging machine and/or a supplying unit for piece goods such as preforms or closures.

14. The container-handling installation according to claim 1, wherein the container-handling installation comprises a labeling machine, wherein the at least one functional element is a gripper on a gripper cylinder or a pallet on a pallet carousel, and wherein the gripper is configured to grip a label in order to attach the label to a container.

15. A method for conveying functional elements in a container-handling installation for handling containers, in which at least two conveying elements each having at least one functional element provided for handling containers are conveyed one after the other and independently of one another along the conveyance path by means of conveyance path magnetic force units which are positioned along the conveyance path and which are at least partially separately controllable in order to interact with one magnetic force unit of the respective conveying element, wherein each conveying element is mounted with a bearing unit such that the at least two conveying elements are mounted on a common shaft,
wherein each conveying element is coupled to the first end of a first arm and to a first end of a second arm,
wherein a first bearing element of the bearing unit of the transport element is positioned at the second end of the first arm,
wherein the second end of the first arm is a free end of the first arm,
wherein a second bearing element of the bearing unit of the transport element is positioned at the second end of the second arm, and
wherein the second end of the second arm is a free end of the second arm.

* * * * *